(12) United States Patent
Joung et al.

(10) Patent No.: US 8,488,660 B2
(45) Date of Patent: Jul. 16, 2013

(54) SIGNAL ANALYZING APPARATUS FOR LTE SYSTEM

(75) Inventors: Jinsoup Joung, Seongnam-si (KR); Kyeongmin Ha, Seongnam-si (KR); Seunghwan Ji, Seongnam-si (KR); Jaesung Lee, Seongnam-si (KR)

(73) Assignee: Innowireless Co., Ltd. (KR)

( * ) Notice: Subject to any disclaimer, the term of this patent is extended or adjusted under 35 U.S.C. 154(b) by 459 days.

(21) Appl. No.: 12/872,416

(22) Filed: Aug. 31, 2010

(65) Prior Publication Data
US 2011/0051792 A1    Mar. 3, 2011

(30) Foreign Application Priority Data
Sep. 1, 2009 (KR) .......................... 10-2009-0081832

(51) Int. Cl.
*H04B 3/46* (2006.01)

(52) U.S. Cl.
USPC ............................. 375/224; 375/316; 375/346

(58) Field of Classification Search
USPC .................. 375/224, 340, 373; 455/132, 561, 455/118; 370/328
See application file for complete search history.

(56) References Cited

U.S. PATENT DOCUMENTS

| 8,160,121 B2* | 4/2012 | Forenza et al. | 375/141 |
| 2007/0184798 A1* | 8/2007 | Bitran et al. | 455/132 |
| 2009/0253390 A1* | 10/2009 | Georgantas et al. | 455/118 |
| 2009/0312056 A1* | 12/2009 | Drugge et al. | 455/561 |
| 2010/0040184 A1* | 2/2010 | Haralabidis et al. | 375/373 |
| 2010/0118924 A1* | 5/2010 | Pal | 375/219 |

FOREIGN PATENT DOCUMENTS
KR   1020040057114   7/2004
KR   1020050101265   10/2005

* cited by examiner

*Primary Examiner* — Daniel Washburn
*Assistant Examiner* — Fitwi Hailegiorgis
(74) *Attorney, Agent, or Firm* — Cantor Colburn LLP

(57) ABSTRACT

A signal analysis apparatus of an LTE system includes a radio frequency reception unit for receiving a radio frequency signal of the LTE system and converting it into a signal of an intermediate frequency, a digital signal conversion unit for converting an analog signal, processed by the radio frequency reception unit, into a digital signal, a baseband conversion unit for converting the signal of the intermediate frequency into a baseband signal, a baseband signal simple analysis unit for decoding the baseband signal in real time in accordance with an LTE standard, a signal depository for storing the baseband signal, a baseband signal precision analysis unit for decoding and analyzing the baseband signal in accordance with the LTE standard and analyzing various items derived in the decoding process, two switching units for alternatively connecting the baseband conversion unit or the signal depository to the baseband signal simple analysis unit or the baseband signal precision analysis unit, and a control unit for controlling the switching units.

6 Claims, 6 Drawing Sheets

SIGNAL ANALYZING APPARATUS FOR LTE SYSTEM

CROSS-REFERENCES TO RELATED APPLICATION

Priority to Korean patent application number 10-2009-0081832 filed on 1, 2009, the entire disclosure of which is incorporated by reference herein, is claimed.

BACKGROUND OF THE INVENTION

1. Field of the Invention

The present invention relates to a signal analysis apparatus and method of a Long Term Evolution (LTE) system and, more particularly, to a signal analysis apparatus of an LTE system, which is capable of performing both simple signal analysis and precise signal analysis according to a user's intention when signals of the LTE system are analyzed.

2. Background of the Related Art

In the $3^{rd}$ Generation Partnership Project (3GPP), generation mobile communication systems have been improved by continuously adding technologies, such as HSDPA, MBMS, and HSUPA, since the $3^{rd}$ generation mobile communication standardization of WCDMA. Furthermore, a LTE standard based on OFDMA/SC-FDMA transmission schemes has been performed since the year 2005. Today, for the purpose of an IMT-Advanced standard of ITU-R, an LTE-Advanced standard improved from the LTE standard is being prepared. The LTE-Advanced standard is one of potent candidates of the IMT-Advanced standard and being widely supported by service providers.

FIG. 1 shows a frame construction of an LTE signal. As shown in FIG. 1, 10 sub-frames exist within one frame of the LTE signal. Signal processing is performed on a sub-frame basis. Since the length of one sub-frame is short (i.e., 1 ms), such signal processing has to be performed within 1 ms for real-time signal analysis.

FIG. 2 is a schematic block diagram showing a real-time signal analysis apparatus of a conventional LTE system. As shown in FIG. 2, the real-time signal analysis apparatus of the conventional LTE system can chiefly include a radio frequency reception unit 10, a digital signal conversion unit 20, a baseband conversion unit 30, and a baseband signal simple analysis unit 40.

In the above-described construction, the radio frequency reception unit 10 functions to receive a radio frequency signal and convert the radio frequency signal into an electrical signal of an intermediate frequency. The digital signal conversion unit 20 functions to convert the analog signal into a digital signal. The baseband conversion unit 30 functions to convert the signal of the intermediate frequency into a baseband signal. The baseband signal simple analysis unit 40 functions to decode and analyze the baseband signal in real time according to LTE standards.

FIG. 3 is a detailed block diagram showing the baseband signal simple analysis unit 40 of the signal analysis apparatus shown in FIG. 2. As shown in FIG. 3, the conventional baseband signal simple analysis unit can chiefly include an LTE uplink signal decoding unit and an LTE downlink signal decoding unit. In the above-described construction, the LTE uplink signal decoding unit can include a Single Carrier-Frequency Division Multiple Access (SC-FDMA) signal demodulator 41U for demodulating an SC-FDMA-modulated baseband signal, a resource element demapper 42U for demapping resource elements to which a Physical Uplink Shared Channel (PUSCH), a Physical Uplink Control Channel (PUCCH), or an RS has been mapped on a sub-frame basis from the demodulated SC-FDMA signal, a transform pre-decoder 43U for transforming the frequency domain symbol of the demapped resource elements into a time domain symbol through reverse Discrete Fourier Transform (DFT), a modulation demapper 44U for demapping the time domain symbol into a bit stream, and a descrambler 45U for restoring the scramble bit stream, demapped into the bit stream, into an original bit stream.

Meanwhile, in the LTE downlink signal decoding unit, the number of some elements (i.e., an OFDM signal demodulator 41L and a resource element demapper 42L) is required to be the same as N number of antennas by taking Multi-Input Multi-Output (MIMO) (i.e., a multi-antenna technique) into consideration. Further, the number of other elements (i.e., a modulation demapper 45L and a descrambler 46L) is required to be the same as L number of layers.

In the above-described construction, the OFDM signal demodulator 41L demodulates an Orthogonal Frequency Division Multiplexing (OFDM)-modulated baseband signal unlike an uplink signal. The resource element demapper 42L demaps a resource element to which a PDSCH, a PDCCH, or an RS has been mapped on a sub-frame basis from the demodulated OFDM signal. Next, a transform pre-decoder 43L precodes symbol streams which have been received from N number of the antennas and demapped. A layer demapper 44L converts the precoded symbol streams into N number of symbol streams through layer demapping. Next, the modulation demapper 45L demaps the symbols to a bit stream. The descrambler 46L restores a scramble bit stream, demapped to the bit stream, to an original bit stream.

Meanwhile, in order to develop LTE base stations and terminals, various analysis results for an LTE signal are required. In particular, in the case of an LTE physical layer, analysis results, such as a spectrum, an Inphase/Quadrature (I/Q) constellation, an Error Vector Magnitude (EVM), and a Carrier-to-Interference-plus-Noise-Ratio (CINR), have to be provided in order to develop base stations and terminals.

However, in accordance with the above-described prior art, only whether a decoded bit stream coincides with an original bit stream can be analyzed, and various signal analyses, such as a spectrum, an I/Q constellation, an EVM, and a CINR, are performed through a signal analysis before decoding. Accordingly, there is a problem in that in reality, the various signal analyses cannot be processed using the simple analysis apparatus shown in FIG. 2 because of the time constraints.

SUMMARY OF THE INVENTION

Accordingly, the present invention has been made in view of the above problems occurring in the prior art, and it is an object of the present invention to provide the signal analysis apparatus of an LTE system, which enables an efficient signal analysis by selectively performing simple signal analysis in which only limited items are simply analyzed and precise signal analysis in which a variety of items are precisely analyzed, according to a user's intention.

To achieve the above object, the signal analysis apparatus of an LTE system according to the present invention includes a radio frequency reception unit for receiving a radio frequency signal of the LTE system and converting the radio frequency signal into a signal of an intermediate frequency; a digital signal conversion unit for converting an analog signal, processed by the radio frequency reception unit, into a digital signal; a baseband conversion unit for converting the signal of the intermediate frequency into a baseband signal; a baseband signal simple analysis unit for decoding the baseband signal in real time in accordance with an LTE standard; a signal depository for storing the baseband signal; a baseband signal precision analysis unit for decoding and analyzing the baseband signal in accordance with the LTE standard and analyzing various items derived in the decoding process; two switching units for alternatively connecting an output terminal of the baseband conversion unit or the signal depository to an input terminal of the baseband signal simple analysis unit or the baseband signal precision analysis unit; and a control unit for controlling switching of the switching units.

The baseband signal precision analysis unit analyzes one or more of a frequency spectrum, a magnitude of time domain and frequency domain I/Q signals, an Error Vector Magnitude (EVM), Carrier-to-Interference-plus-Noise-Ratio (CINR) information, and Inphase/Quadrature (I/Q) constellation.

Each of the baseband signal simple analysis unit and the baseband signal precision analysis unit comprises an LTE uplink signal decoding unit and an LTE downlink signal decoding unit.

BRIEF DESCRIPTION OF THE DRAWINGS

Further objects and advantages of the invention can be more fully understood from the following detailed description taken in conjunction with the accompanying drawings in which.

DESCRIPTION OF REFERENCE NUMERALS OF PRINCIPAL ELEMENTS IN THE DRAWINGS

| 10: radio frequency reception unit | 70: key entry unit |
|---|---|
| 20: digital signal conversion unit | 80: control unit |
| 30: baseband conversion unit | 90: display unit |
| 110, 120: switching unit | 50: signal depository |
| 40: baseband signal simple analysis unit | |
| 60: baseband signal precision analysis unit | |

DETAILED DESCRIPTION OF EMBODIMENTS

A signal analysis apparatus of an LTE system according to an exemplary embodiment of the present invention is described in detail with reference to the accompanying drawings.

Figure 1:
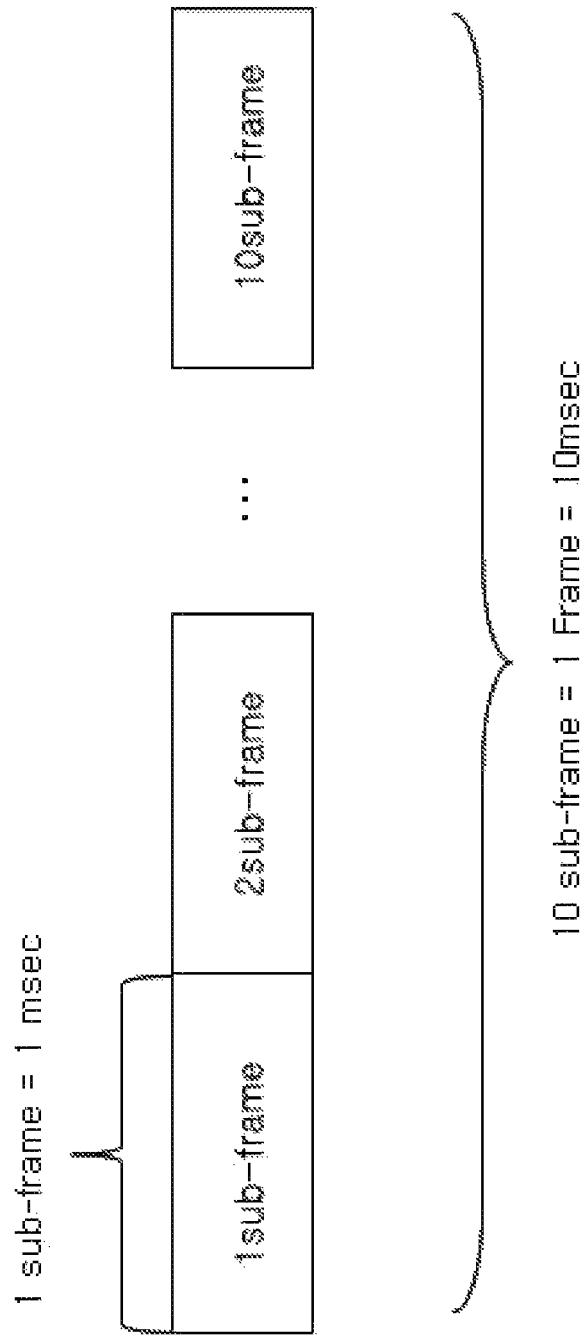
FIG. 1 shows a frame construction of an LTE signal.
Figure 2:
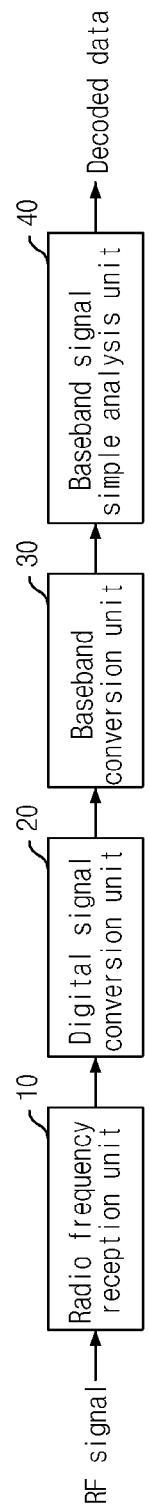
FIG. 2 is a schematic block diagram showing a real-time signal analysis apparatus of a conventional LTE system.
Figure 4:
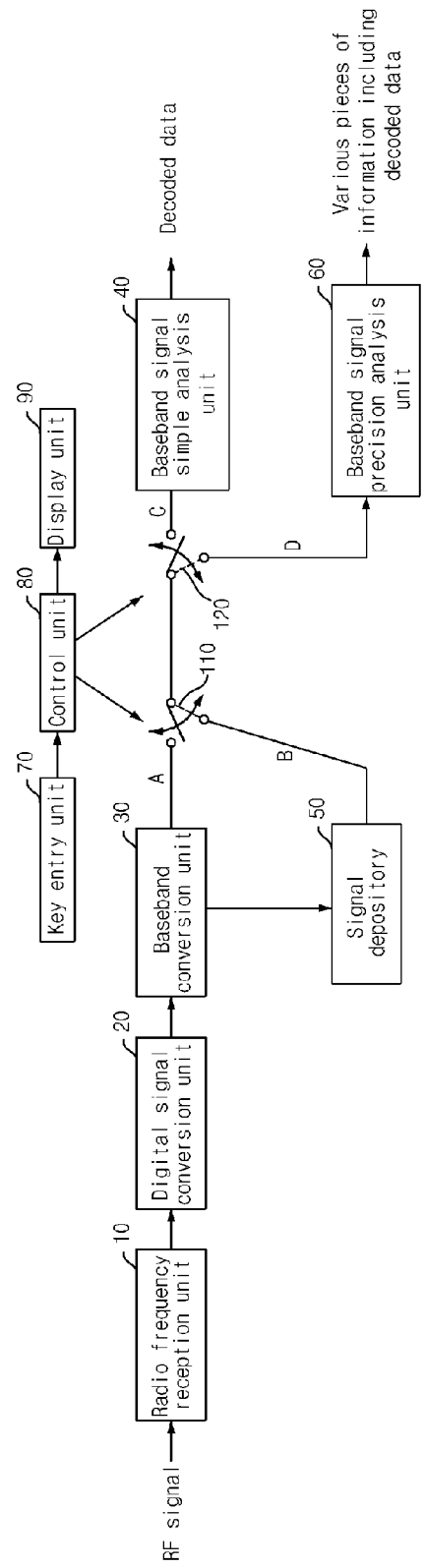
FIG. 4 is a block diagram showing the signal analysis apparatus of an LTE system according to an embodiment of the present invention.

FIG. 4 is a block diagram showing the signal analysis apparatus of an LTE system according to an embodiment of the present invention. The same reference numerals are used to refer to the same parts as the conventional construction, and a description there of is omitted. As shown in FIG. 4, the signal analysis apparatus of an LTE system according to the present invention further includes a signal depository 50 and a baseband signal precision analysis unit 60, in addition to the radio frequency reception unit 10, the digital signal conversion unit 20, the baseband conversion unit 30, and the baseband signal simple analysis unit 40 shown in FIG. 2. The signal analysis apparatus according to the present invention can further include two switching units 110 and 120 for alternatively inputting a signal, output by the baseband conversion unit 30 or the signal depository 40, to the baseband signal simple analysis unit 40 and the baseband signal precision analysis unit 60, a key entry unit 70 for receiving a desired analysis mode from a user, a display unit 90 for displaying analysis results and various items required in key entry or operation processes so that the user can know them, and a control unit 80 for controlling the switching operation of the switching units 110 and 120 according to an analysis mode received from the key entry unit 70.

In the above-described construction, the signal depository 50 functions to continuously stores baseband signals as much as the magnitude of the depository and continuously output them to the baseband signal simple analysis unit 40 or the baseband signal precision analysis unit 60. The signal depository 50 can be implemented using a common hard disk or flash memory.

Next, the baseband signal precision analysis unit 60 functions to decode and analyze the baseband signal according to an LTE standard. The baseband signal precision analysis unit 60 analyzes a variety of analysis items derived in the process of decoding the baseband signal stored in the signal depository 50 so as to provide various signal analysis results, such as a frequency spectrum, the magnitude of time and frequency domain I/Q signals, an EVM, CINR information, and I/Q constellation, for a sufficient period of time and provides the variety of analysis items.

Next, the control unit 80 can be implemented using a common microprocessor. The display unit 90 can be implemented using a common flat display. The switching units 110 and 120 can be implemented using software program.

Figure 3:
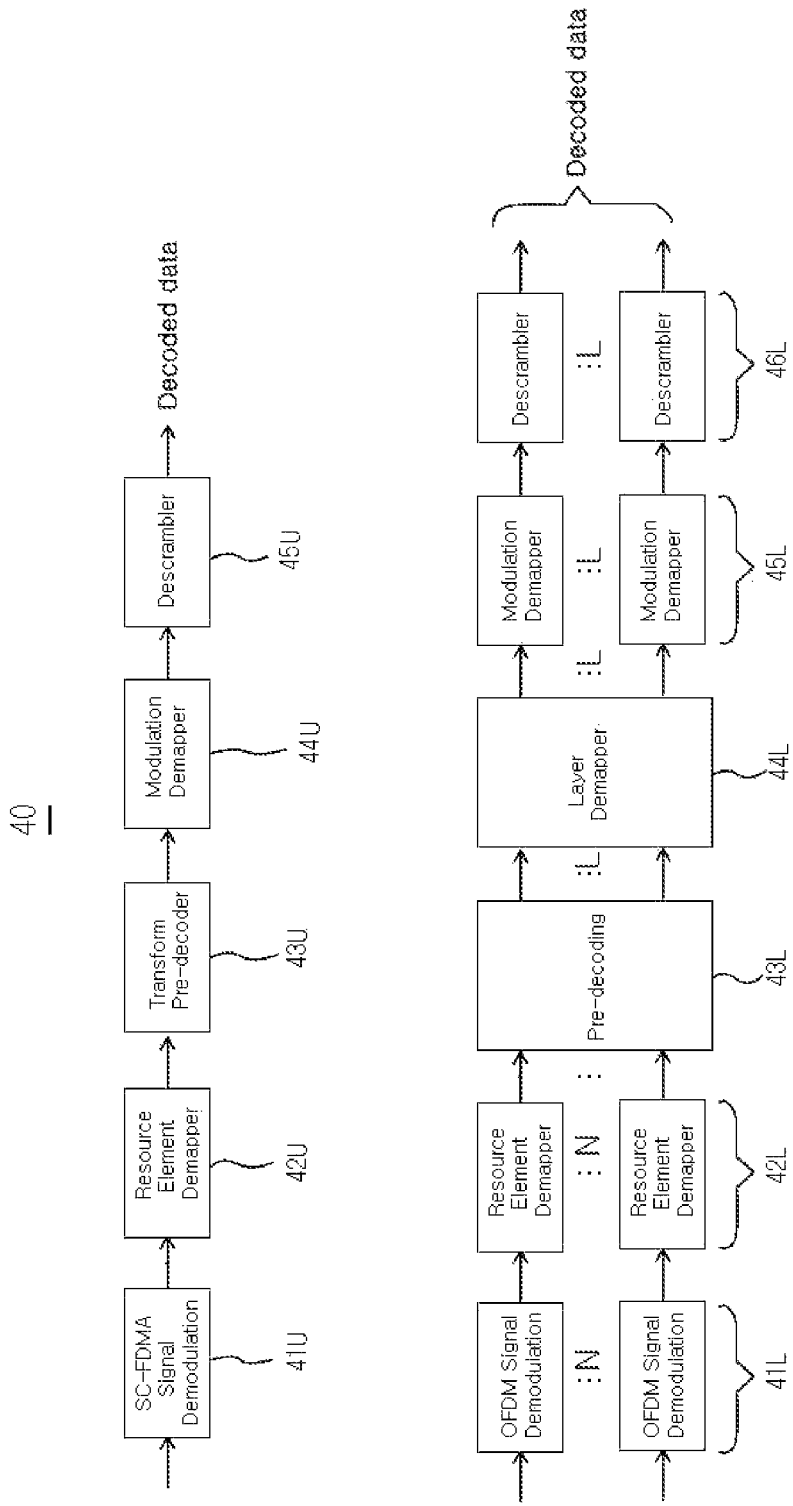
FIG. 3 is a detailed block diagram showing the baseband signal simple analysis unit of the signal analysis apparatus shown in FIG. 2.
Figure 5:
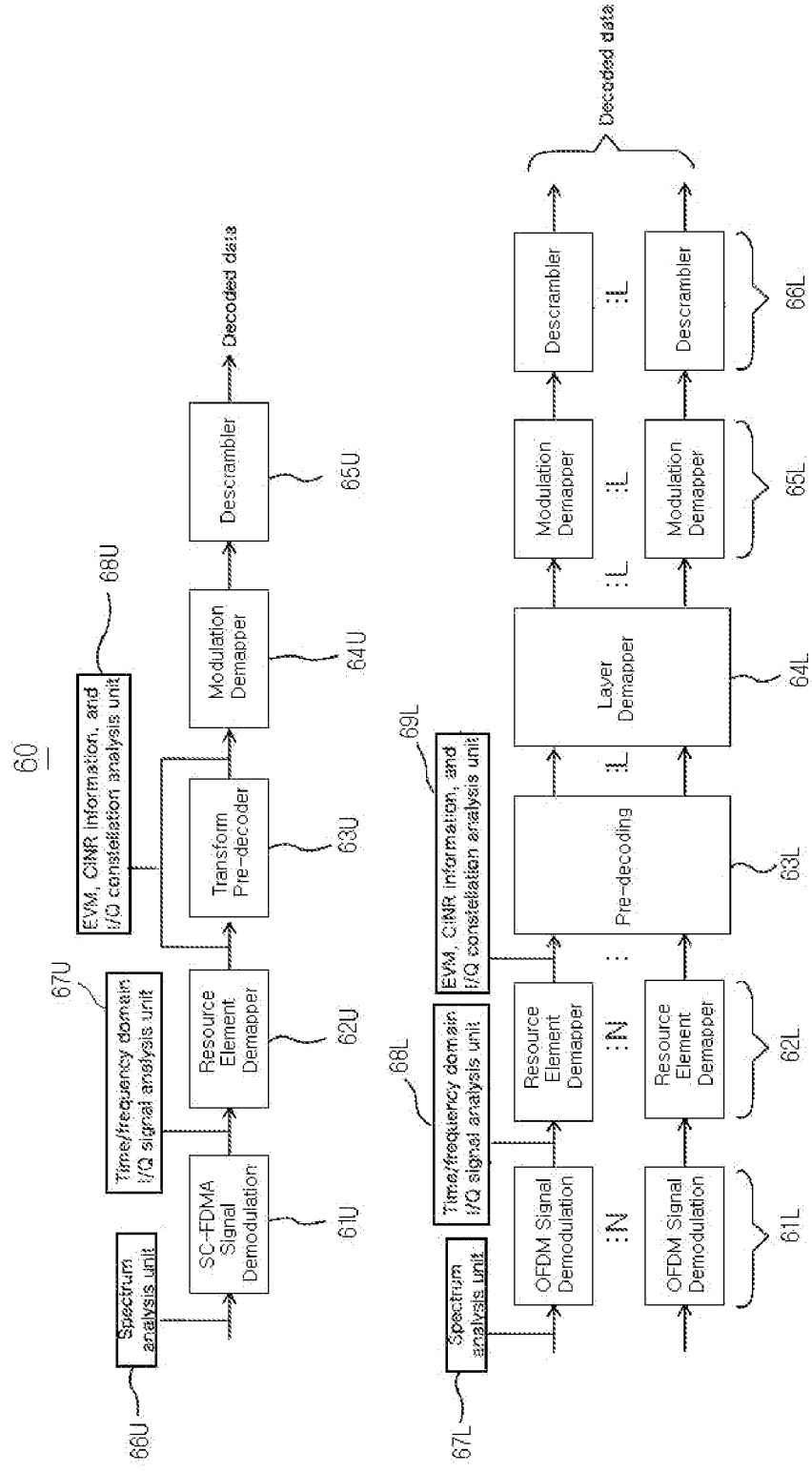
FIG. 5 is a block diagram showing the baseband signal precision analysis unit of the signal analysis apparatus of an LTE system according to an embodiment of the present invention.

FIG. 5 is a block diagram showing the baseband signal precision analysis unit of the signal analysis apparatus of an LTE system according to an embodiment of the present invention. In FIG. 5 an SC-FDMA signal demodulator 61U, a resource element demapper 62U, a transform pre-decoder 63U, a modulation demapper 64U, and a descrambler 65U, and an OFDM signal demodulator 61L, a resource element demapper 62L, a transform pre-decoder 63L, a layer demapper 64L, a modulation demapper 65L, and a descrambler 66L are the same as the corresponding elements of the baseband signal simple analysis unit 40 shown in FIG. 3, and a detailed description thereof is omitted.

As shown in FIG. 5, the baseband signal precision analysis unit 60 of the present invention can include the LTE uplink signal decoding unit and the LTE downlink signal decoding unit. Meanwhile, the LTE uplink signal decoding unit of the baseband signal precision analysis unit 60 according to the present invention can further include a spectrum analysis unit 66U for analyzing the frequency spectrum of a baseband signal output by the signal depository 50, a time and frequency domain I/Q signal analysis unit 67U for analyzing the I/Q signal of the time or frequency domain from an SC-FDMA-demodulated baseband signal, and an EVM, CINR information, and I/Q constellation analysis unit 68U for analyzing an EVM, CINR information, and an I/Q constellation on the basis of a signal demapped by the resource element demapper 62U and a signal transformed into a time domain symbol by the transform pre-decoder 63U, in addition to the elements of the LTE uplink signal decoding unit of the baseband signal simple analysis unit 40.

Here, the spectrum analysis unit 66U functions to display a frequency domain spectrum of the baseband signal and analyze a signal. The time and frequency domain I/Q signal analysis unit 67U functions to represent a magnitude of the time domain/frequency domain I/Q signal and analyze a signal analysis. The EVM, CINR information, and I/Q constellation analysis unit 68U functions to analyze an EVM, CINR information, and I/Q constellation. The EVM and CINR is an index to indicate the quality of a signal. If the magnitude of noise increases, the EVM value is increased, but the CINR value is decreased. The I/Q constellation is used to display the I/Q signals of a signal in the constellation and analyze the signal.

Next, the LTE downlink signal decoding unit of the baseband signal precision analysis unit 60 according to the present invention can further include in addition to the elements of the LTE downlink signal decoding unit of the baseband signal simple analysis unit 40, a spectrum analysis unit 67L for analyzing the frequency spectrum of the baseband signal output by the signal depository 50, a time and frequency domain I/Q signal analysis unit 68L for analyzing the I/Q signal of the time or frequency domain from the OFDM-demodulated baseband signal, and an EVM, CINR information, and I/Q constellation analysis unit 69L for analyzing an EVM, CINR information, and I/Q constellation on the basis of a signal demapped by the resource element demapper 62L.

Figure 6:
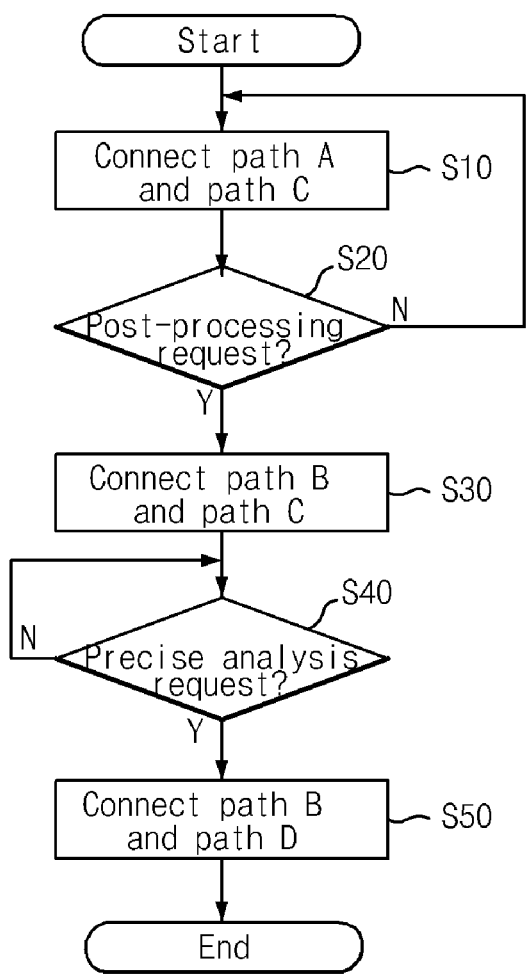
FIG. 6 is a flowchart illustrating the operation of the signal analysis apparatus of an LTE system according to an embodiment of the present invention.

FIG. 6 is a flowchart illustrating the operation of the signal analysis apparatus of an LTE system according to an embodiment of the present invention. It is to be noted that the control unit 80 serves as the subject and performs the operation. As shown in FIG. 6, in accordance with the signal analysis apparatus of an LTE system according to the present invention, first, at step S10, the control unit 80 controls the switching units 110 and 120 so that the switching units 110 and 120 connect a path A to a path C (i.e., connect the baseband conversion unit 30 to the baseband signal simple analysis unit 40) in a default status (i.e., in case where a user has not inputted a mode switching command through the key entry unit 70) and simple analysis of a baseband signal converted by the baseband conversion unit 30 is performed.

In this state, at step S20, the control unit 80 determines whether a post-processing request has been received through the key entry unit 70. If, as a result of the determination, the post-processing request is determined not to have been received, the control unit 80 repeatedly performs the step S10. However, if, as a result of the determination, the post-processing request is determined to have been received, the control unit 80 connects a path B to the path C (i.e., connects the baseband signal, stored in the signal depository 50, to the baseband signal simple analysis unit 40) at step S30.

Next or after the step S10, it is determined whether a precise analysis request has been received through the key entry unit 70 at step S40. If, as a result of the determination, the precise analysis request is determined to have been received, the control unit 80 connects the path B to the path D (i.e., connects the baseband signal, stored in the signal depository 50, to the baseband signal precision analysis unit 60) so that precise analysis of a variety of items is performed at step S50.

The signal analysis apparatus of an LTE system according to the present invention is not limited to the above embodiments and can be modified in various ways within the technical spirit of the present invention.

As described above, in accordance with the signal analysis apparatus of an LTE system according to the present invention, simple signal analysis in which only limited items are simply analyzed and precise signal analysis in which a variety of items are precisely analyzed are selectively performed according to a user's intention. Accordingly, efficient signal analysis can be performed. That is, when signal analysis is performed by an LTE system, the analysis time can be greatly reduced, complexity can be minimized, and precise and various analysis results of a desired signal part can be shown through a post-processing process. Accordingly, the advantages of both real-time analysis and post-processing signal analysis can be taken.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A signal analysis apparatus of a Long Term Evolution (LTE) system, comprising:
   a radio frequency reception unit for receiving a radio frequency signal of the LTE system and converting the radio frequency signal into a signal of an intermediate frequency;
   a digital signal conversion unit for converting an analog signal, processed by the radio frequency reception unit, into a digital signal;
   a baseband conversion unit for converting the signal of the intermediate frequency into a baseband signal;
   a baseband signal simple analysis unit to decode the baseband signal in real time in accordance with an LTE standard;
   a signal depository for storing the baseband signal;
   a baseband signal precision analysis unit to decode and analyze the baseband signal in accordance with the LTE standard and to analyze various items derived in the decoding process, the baseband signal precision analysis unit comprising a spectrum analysis unit, a time/frequency domain I/Q signal, an analysis unit and an Error Vector Magnitude (EVM), Carrier-to-Interference-plus-Noise Ratio (CINR) information, and I/Q constellation analysis unit;
   a first switching unit that alternatively connects an output terminal of the baseband conversion unit or the signal depository to a common node, and a second switching unit that alternatively connects an input terminal of the baseband signal simple analysis unit or the baseband signal precision analysis unit to the common node; and
   a control unit that controls switching of the switching units in response to a simple analysis request or a precise analysis request from a user.

2. The signal analysis apparatus as claimed in claim 1, wherein the switching units are implemented in software.

3. The signal analysis apparatus as claimed in claim 2, wherein the baseband signal precision analysis unit analyzes one or more of a frequency spectrum, a magnitude of time domain and frequency domain I/Q signals, an Error Vector Magnitude (EVM), Carrier-to-Interference-plus-Noise-Ratio (CINR) information, and Inphase/Quadrature (I/Q) constellation.

4. The signal analysis apparatus as claimed in claim 3, wherein each of the baseband signal simple analysis unit and the baseband signal precision analysis unit comprises an LTE uplink signal decoding unit and an LTE downlink signal decoding unit.

5. The signal analysis apparatus as claimed in claim 2, wherein each of the baseband signal simple analysis unit and the baseband signal precision analysis unit comprises an LTE uplink signal decoding unit and an LTE downlink signal decoding unit.

6. The signal analysis apparatus as claimed in claim 1, wherein each of the baseband signal simple analysis unit and the baseband signal precision analysis unit comprises an LTE uplink signal decoding unit and an LTE downlink signal decoding unit.

* * * * *